United States Patent [19]

Crapanzano et al.

[11] Patent Number: 4,773,013
[45] Date of Patent: Sep. 20, 1988

[54] DIGITAL ANTISKID CONTROL SYSTEM

[75] Inventors: Angelo T. Crapanzano, Akron; Ralph J. Hurley, Mogadore, both of Ohio

[73] Assignee: Loral Corporation, New York, N.Y.

[21] Appl. No.: 733,336

[22] Filed: May 13, 1985

[51] Int. Cl.$^4$ ................................................ B60T 8/32
[52] U.S. Cl. ................................. 364/426.02; 303/95; 303/108
[58] Field of Search ................. 364/426, 565, 566; 303/95, 105, 108; 361/238

[56] References Cited

U.S. PATENT DOCUMENTS

| | | | |
|---|---|---|---|
| 4,285,042 | 8/1981 | Ohmori et al. | 364/426 |
| 4,327,414 | 4/1982 | Klein | 303/108 |
| 4,384,330 | 5/1983 | Matsuda et al. | 364/426 |
| 4,435,768 | 3/1984 | Arikawa | 364/426 |
| 4,468,740 | 8/1984 | Beck et al. | 364/426 |
| 4,506,339 | 3/1985 | Kühnlein | 364/565 |
| 4,517,647 | 5/1985 | Harada et al. | 364/426 |
| 4,530,059 | 7/1985 | Brearley et al. | 364/426 |
| 4,578,755 | 3/1986 | Quinn et al. | 364/565 |

Primary Examiner—Gary Chin
Attorney, Agent, or Firm—P. E. Milliken; R. L. Weber

[57] ABSTRACT

A digital antiskid system for utilization with the braking system of an aircraft. Analog wheel speed signals are digitized and manipulated by a digital processor, under program control, to generate a control signal as a function of the deceleration activity of the wheels. The digital control signal is converted to an analog signal for application to a brake valve to effect application or release of brake pressure.

5 Claims, 14 Drawing Sheets

# DIGITAL ANTISKID CONTROL SYSTEM

TECHNICAL FIELD

The invention herein resides in the art of antiskid brake control systems and, more particularly, such systems as they are utilized in the aircraft industry. Specifically, the invention presents a digital antiskid control system which functions to optimize braking efficiency commensurate with passenger comfort. The invention incorporates a microprocessor for monitoring and processing wheel speed signals to both determine and anticipate braking action. The microprocessor then takes such remedial action as is necessary to prevent or inhibit skidding activity.

BACKGROUND ART

Antiskid systems for vehicles have been known for many years. Such systems have been used extensively in the trucking and railroad industries and are now being utilized on automobiles. However, the invention of interest herein, while being applicable to any vehicle having a braked wheel, is most particularly suited for implementation in the aircraft industry. In such industry, antiskid brake control systems are typically used to prevent skidding activity. It is understood that braking efficiency drops to nearly zero when the braked wheels lock-up or skid. Optimum braking efficiency is attained when braking is performed in such a manner as to allow the wheels to approach a skid without actually entering a skid. In other words, braking activity should occur near the peak of the mu-slip curve, as is now well known in the art. Further, present day antiskid brake control systems attain high efficiency by incorporating therein proportional, integral, and derivative inputs corresponding to the braking activity of the wheels.

It is further presented that modern day antiskid control systems, responsible for stopping large aircraft at high speeds while ensuring the lives of hundreds of passengers, must be quickly responsive to changing conditions, and highly accurate in operation. Further, such a system must be capable of adapting, through programming, to accommodate various aircraft characteristics such as are inherent with weight, landing speed, strut design, hydraulic system lag, and the like.

There have, of course, been many previously known antiskid brake control systems for aircraft. Typically, such systems have been of an analog nature, consisting of a plurality of discrete components. These discrete components have been responsible for monitoring wheel speed, converting the monitored signal to a varying DC level, and using such signal to modulate or adjust the maximum brake pressure availble to the pilot. However, the previously known analog signals have been inherently slow in response time, costly in production, requiring a large number of discrete components, each having its own inherent reliability limitations. Further, previously known analog systems have required specific dedicated circuitry which could be used for nothing other than antiskid brake control operations. In other words, the hardware provided for brake control is limited solely to the performance of that function.

SUMMARY OF THE INVENTION

In light of the foregoing, it is an object of a first aspect of the invention to provide a digital antiskid control system which is quickly responsive to changing braking conditions and reliable in operation.

Another object of an aspect of the invention is to provide a digital antiskid control system which is highly accurate in its processing capabilities.

An additional object of the invention is to provide a digital antiskid control system which is compact, lightweight, and having a reduced number of elements over prior art systems.

An additional object of an aspect of the invention is to provide a digital antiskid control system which is adaptable to accommodate various aircraft parameters, readily modified to accommodate implementation with various aircraft.

An additional object of an aspect of the invention is to provide a digital antiskid control system which uses a general purpose digital computer or microprocessor which can be used for purposes other than brake control on the aircraft.

Still another object of an aspect of the invention is the provision of a digital antiskid control system which may be readily devised for existing state-of-the-art elements.

The foregoing and other aspects of the invention which will become apparent as the detailed description proceeds are achieved by:

An antiskid system in association with a braked wheel of a vehicle, comprising:

first means connected to the braked wheel for providing an output signal corresponding to wheel speed;

second means connected to said first means for receiving and differentiating said output signal and generating therefrom a deceleration signal;

skid detection means receiving said output signal from said first means and generating a skid signal when the derivative of said output signal exceeds a predetermined level; and brake control means interconnected between said second means and said skid detection means, receiving said deceleration signal and said skid signal and accordingly releasing brake pressure.

DESCRIPTION OF THE DRAWINGS

For a complete understanding of the objects, techniques, and structure of the invention, reference should be had to the following detailed description and accompanying drawings wherein:

FIGS. 1-8 comprise a detailed schematic diagram of the digital antiskid control system of the invention and, more particularly, wherein:

FIG. 1 is a schematic diagram of the squaring circuit receiving wheel speed signals and generating square wave pulses of a frequency corresponding to speed;

FIGS. 2 and 3 present the frequency to digital converter for the wheel speed signal for both the alpha and beta wheels, respectively;

FIG. 4 presents a schematic diagram of the watchdog timer and steering circuitry of the invention, channeling data respecting the alpha and beta wheels to the proper processing circuits;

FIG. 5 is the clock circuitry and frequency divider incorporated in the invention;

FIG. 6 presents the analog to digital converter and buffer circuitry of the system;

FIG. 7 illustrates the microprocessor and related memories, latches, buffers, and transceivers of the system;

FIG. 8 presents the detailed circuitry of the valve drivers of the system;

BEST MODE FOR CARRYING OUT THE INVENTION

The invention herein is presented and described with respect to an aircraft having two braked wheels, or pairs of such wheels, respectively designated alpha and beta. However, the concept of the invention is applicable to systems beyond the dual channel system disclosed herein, being capable of incorporation in aircraft having any number of braked wheels or pairs thereof.

Reference now will be made to the drawings wherein attention may be given to the detailed schematics of FIGS. 1-8, taken in conjunction with the block diagram of FIGS. 9 through 11.

Figure 1:
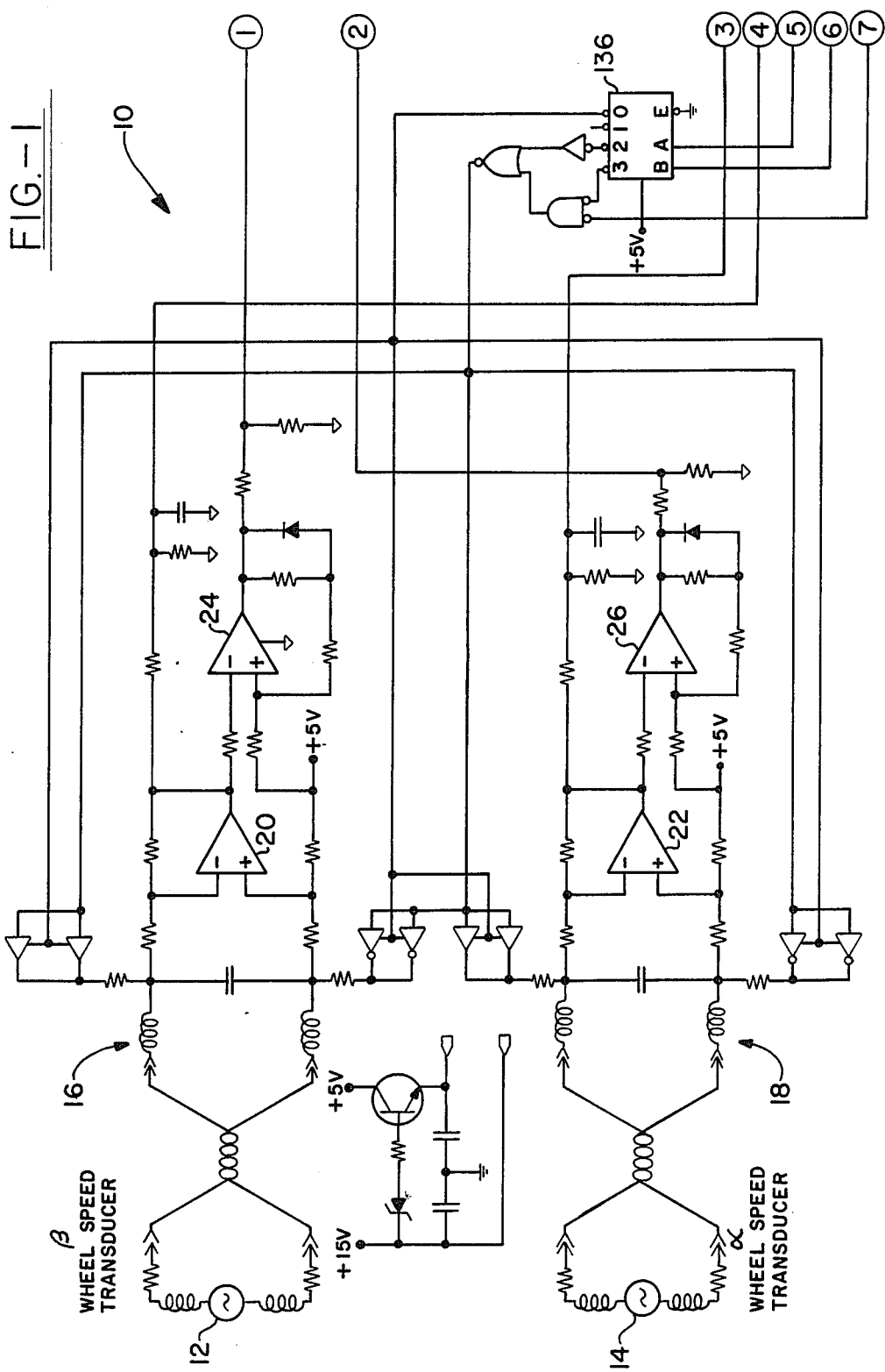

The input circuitry 10 for the alpha and beta wheels is best shown in FIG. 1 wherein wheel speed transducers 12,14 are differentially fed through the choke filters 16,18 to differential amplifiers 20,22. The amplifiers 20,22 are appropriately interconnected to input and feedback resistors to attain a desired gain. As is appreciated by those skilled in the art, the outputs of the amplifiers 20,22 are sinusoidal signals having a frequency corresponding to the instantaneous wheel speed of the respectively associated alpha and beta wheels. These sinusoidal signals are passed to the Schmitt triggers 24,26 where they are squared. As shown, the squaring circuits each include an unbalanced hysteresis feedback network so that the outputs thereof swing about a bias level. Again, it will be understood that the outputs of the Schmitt triggers 24,26 will be square wave signals of a frequency corresponding to wheel speed. These square wave signals are then passed to the frequency to digital converter shown in FIG. 2 for the alpha wheel and in FIG. 3 for the beta wheel.

Figure 3:
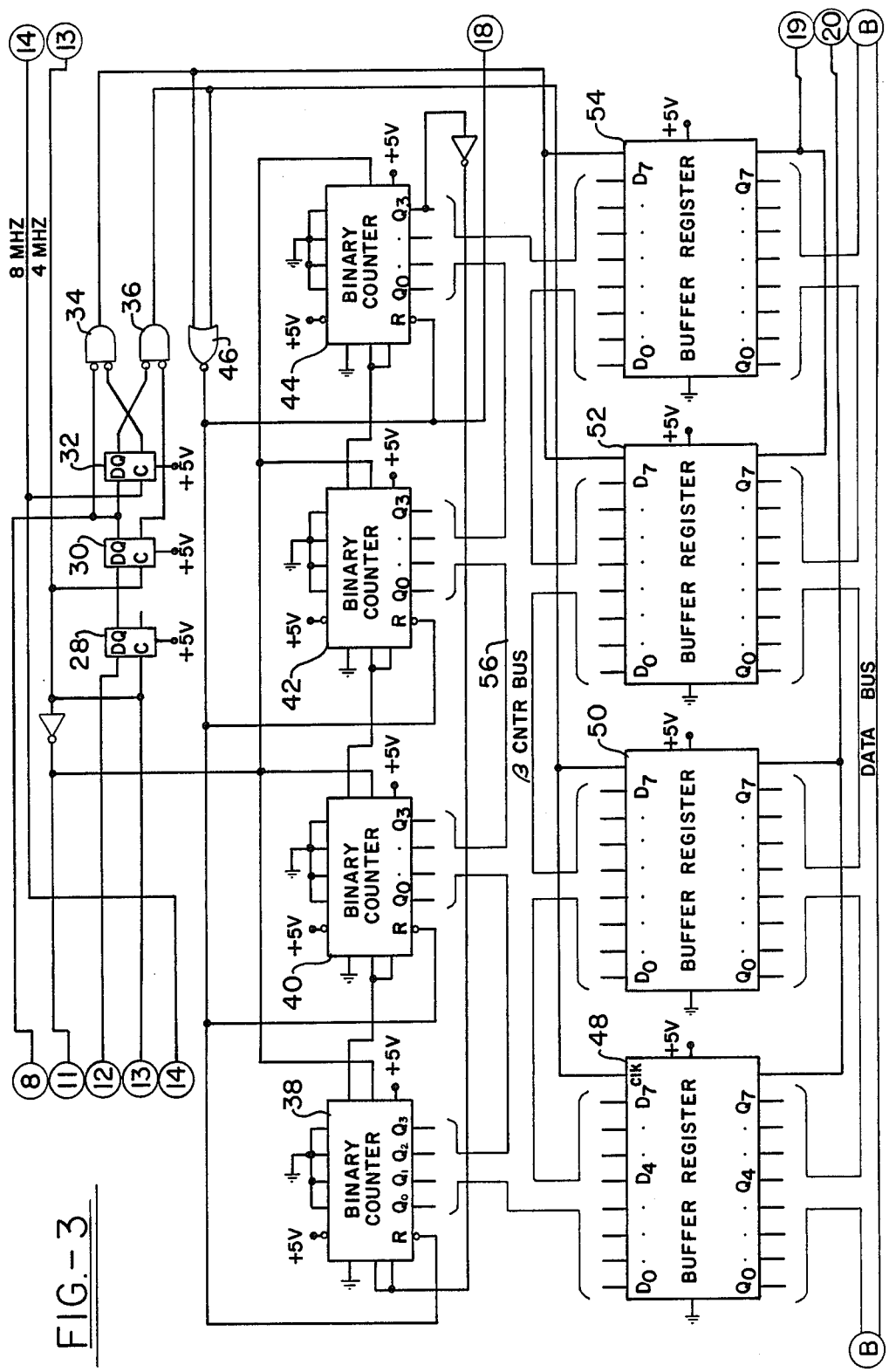

With reference now to FIG. 3, it will be noted that a pair of D-type flip-flops 28,30 are provided to double-clock incoming squared wheel speed signals to prevent gliches in the event that the wheel speed signals become synchronous with the 4 mhz clock which clocks the flip-flops 28,30. The D-type flip-flop 32, clocked by an 8 mhz clock, as shown, receives the outputs of the flip-flop 30. A negative input AND gate 34 receives the complementary output of the flip-flop 32 and is enabled at the other input thereof on each negative half cycle of the wheel speed signal. Similarly, the negative input AND gate 36, which functions as a NOR gate, receives the true output of the flip-flop 32 and is enabled on each positive half cycle of the wheel speed signal. The outputs of the negative input AND gates 34,36 are passed to the NOR gate 46, the output of which is applied to the reset input of the binary counters 38-44. As shown, these counters receive the 4 mhz clock at the clock (CLK) input thereof and count on each clock pulse until reset by the transition of the wheel speed signal output from the gate 46. In other words, each time the wheel speed signal makes the transition from positive to negative, or negative to positive, the counters 38-44 are reset.

It will be understood that during each half cycle of the wheel speed signal, counters 38-44 receive therein a count from the 4 mhz clock, which count corresponds to the frequency, at that point in time, of the wheel speed signal. In other words, the counters 38-44, taken in conjunction with the circuitry 28-36,46 provide for an interloping of the 4 mhz clock and the wheel speed signal, the result being indicative of the instantaneous wheel speed during a particular half cycle of the wheel speed signal. In any event, on each half cycle of the wheel speed signal, the binary counters 38-44 receive and maintain therein a count corresponding to instantaneous wheel speed. On each half cycle transition, this count is passed from the counters 38-44 to the pair of buffer registers 48,50 for positive half cycle counts, and the pair of buffers 52,54 for negative half cycle counts. As shown, the buffer registers 48,50 are clocked by an output from the gate 36, while the registers 52,54 are clocked from the gate 34.

As further shown, the transfer of data from the counters 38-44 to the buffer registers 48-54 is achieved via the counter bus 56. As will further be appreciated, outputs from the buffer registers 48-54 are appropriately gated to the microprocessor via the address/data bus, as will be discussed hereinafter. It should be appreciated that the count maintained within the binary counter 38-44 for each half cycle of the wheel speed, during a fixed period of time, defined by the timing of the pulses of the 4 mhz clock, enables establishment of the instantaneous wheel speed during such half cycle. It will also be appreciated that such wheel speed is now established in digital form, rather than frequency dependent as from the Schmitt trigger 24.

Figure 2:
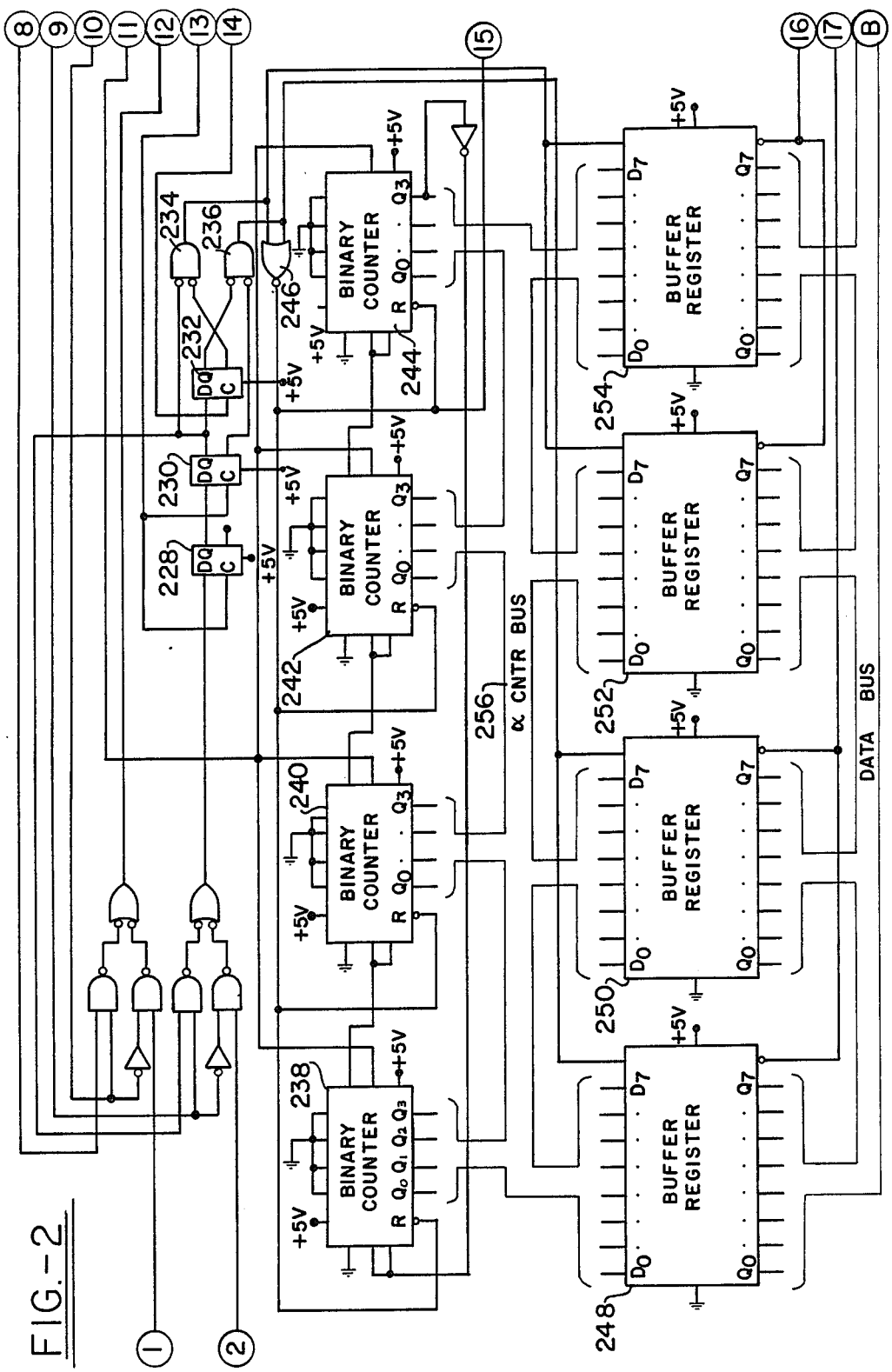

With reference to FIG. 2, it can be seen that the frequency to digital converter for the alpha channel or wheel is substantially identical to that for the beta wheel as shown in FIG. 3. The elements for the alpha channel are shown in FIG. 2 with numerical designations corresponding to those of FIG. 3, but incremented by 200. Accordingly, it can now be appreciated that the output from FIGS. 2 and 3 is a digital signal corresponding to instantaneous wheel speed, the same being updated on each half cycle of the wheel speed signal.

Figure 4:
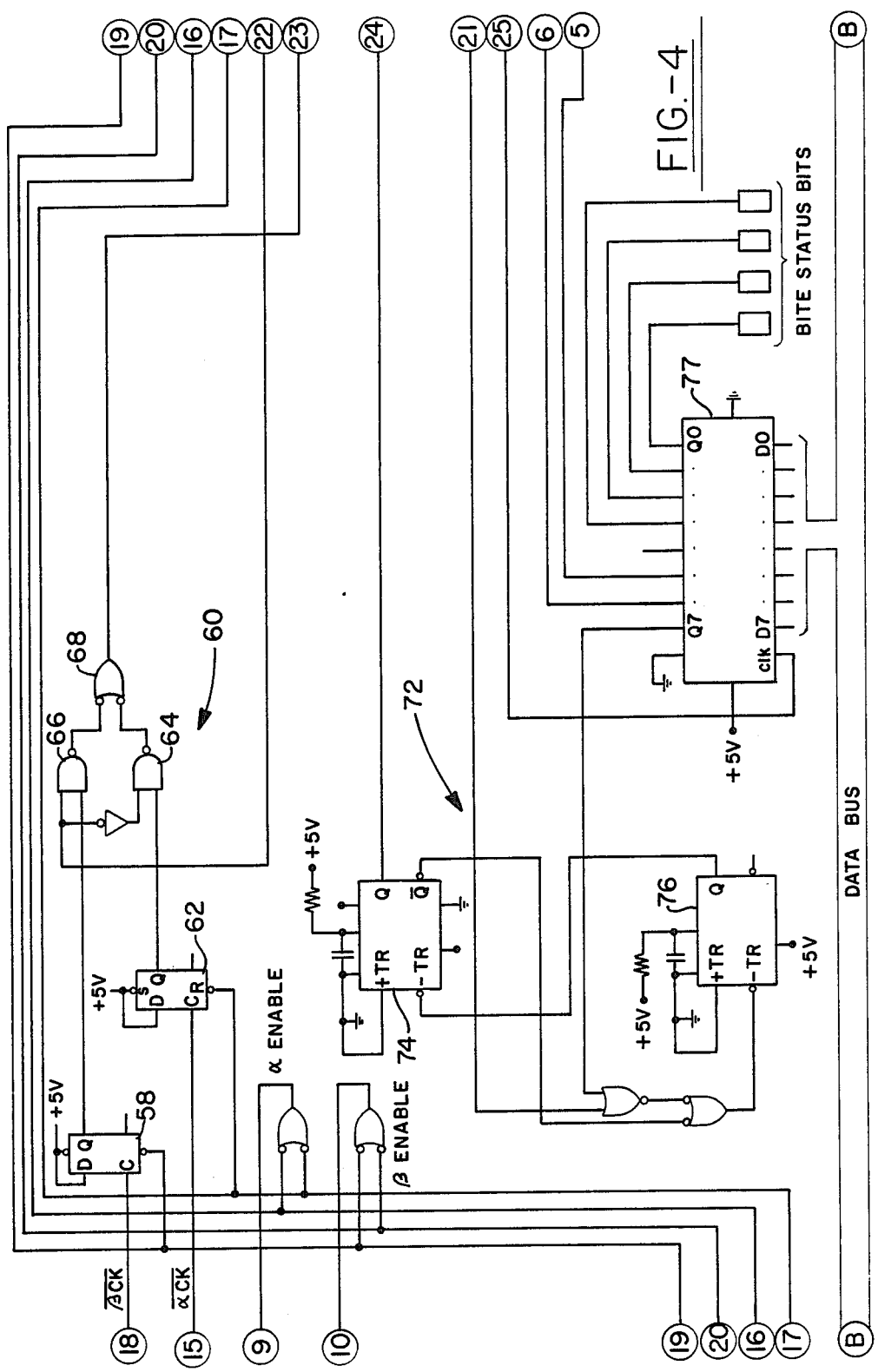

With reference now to FIG. 4, it can be seen that D-type flip-flops 58,62 are respectively clocked by outputs of the NOR gates 46,246, indicating the presence of wheel speed data respectively corresponding to the alpha and beta wheels. The steering circuit 60, comprising gates 64-68, provides an output signal to the octal buffer 70 of FIG. 6, which provides status bits to the microprocessor chip 94 of FIG. 7, indicating the presence of valid data in the appropriate buffer registers 48-54 and 248-254 for reading and processing under program control. It will be appreciated that gates 64,66 operate mutually exclusively due to an inverter interposed between the enabling inputs thereof, dependent on whether alpha or beta data is present. This input is a clock input, generated from the clock circuitry of FIG. 5 to be discussed hereinafter. Each time buffer 52,54 is read the associated flip-flop 58 is reset and each time the buffer 252,254 is read, the flip-flop 62 is reset. Before reading the buffers, the octal buffer 70 is checked to see if valid wheel speed data is present. If so, the buffers are read, if not, appropriate action is taken under program control to correct for the situation.

A watchdog timer 72, comprising one-shots 74-76, is provided for monitoring the microprocessor 94 and the clock circuitry of the system to be certain that the two properly operate. By way of example, should the clock slow down or stop, the watchdog timer senses such a condition, and resets the entire system including the microprocessor so that proper timing of system functions is achieved and maintained. For this purpose, the octal D-type flip-flop 77 is provided to supply status bits regarding certain elements of the system. One such status bit, from the microprocessor chip, is provided as an input to the watchdog timer one-shots 74,76 as illustrated.

The one-shot 76 is repetitively triggered so long as the system properly functions, maintaining its output Q at a high level. When the system malfunctions, the Q output of the one-shot 76 goes low, setting the one-shot 74 high. The Q output of one-shot 74, including a set time delay, retriggers the one-shot 76. This process repeats until the system is operative again.

Figure 5:
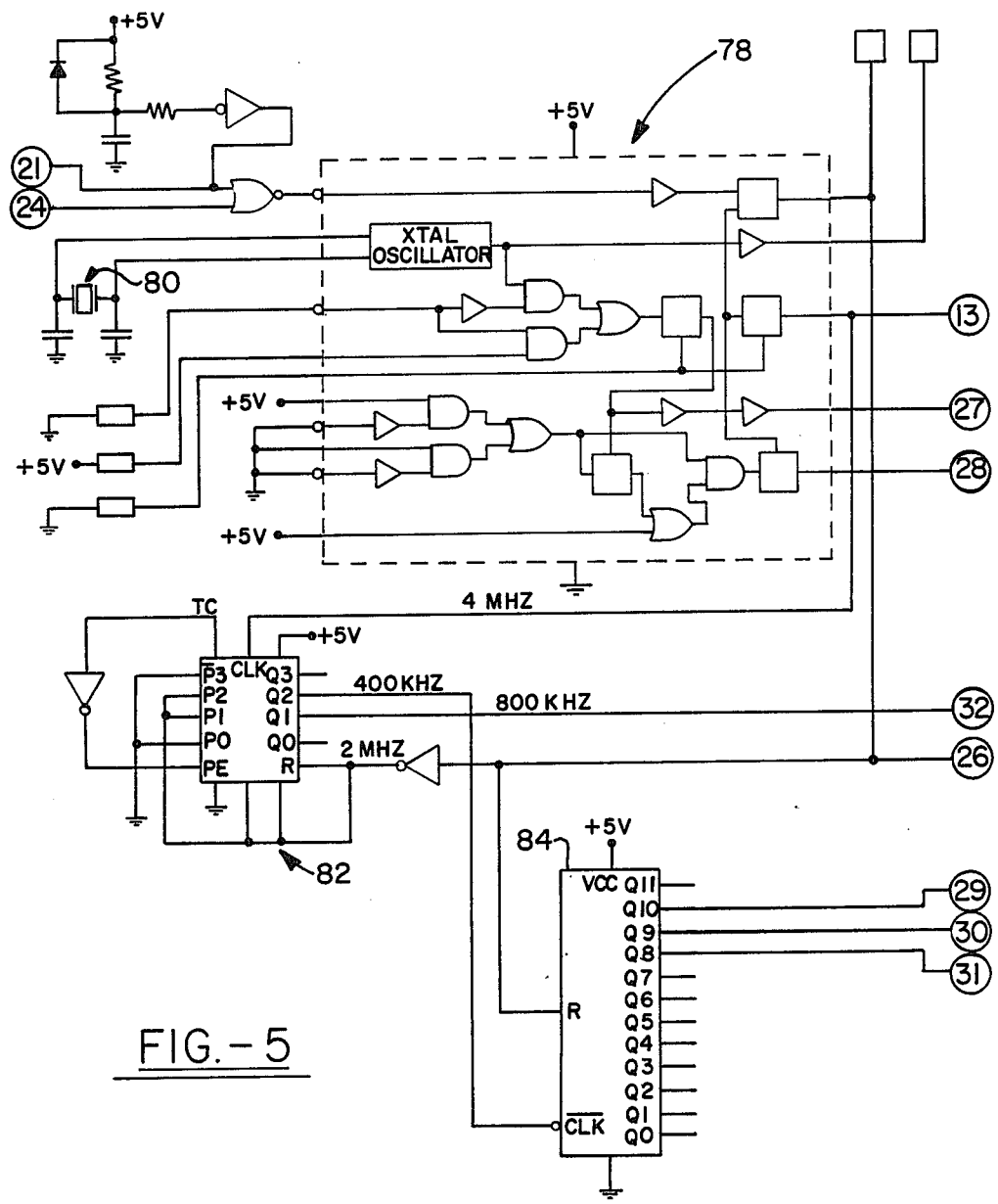

The clock circuitry of the invention is shown in FIG. 5 as including a standard clock 78, which may be of any suitable nature. Of course, a timing crystal 80 may be utilized for exciting the clock 78. A 4bit binary counter 82 and a 12-bit binary counter 84 are provided to act as a frequency divider, providing various clock frequency outputs.

In the embodiment shown, the counter 82 is a programmable binary counter and the counter 84 is a ripple counter. The programnable feature allows for modifying the operational frequency of the system, allowing optimization of the mean time between interrupts.

Figure 6:
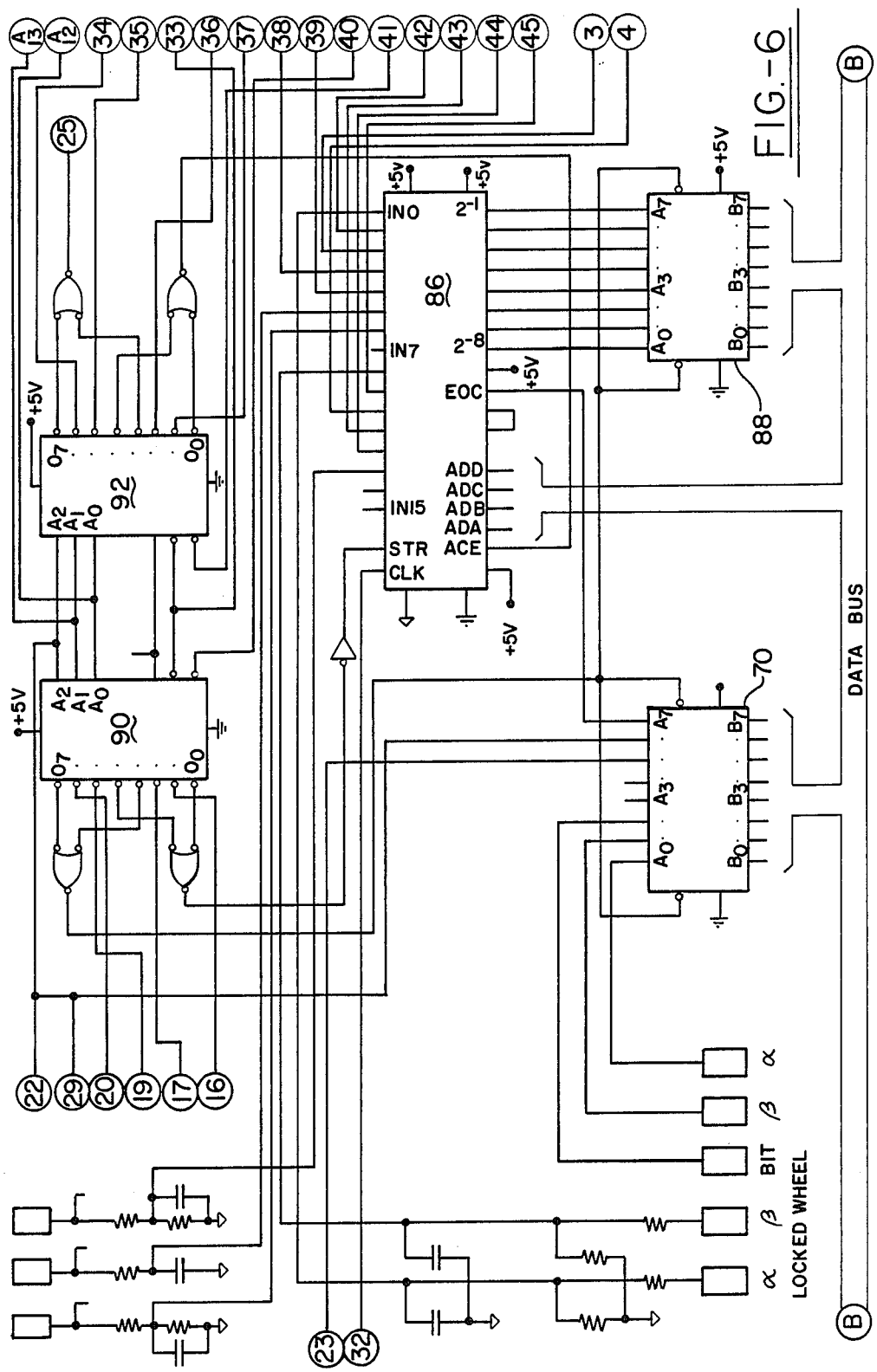

Referring now to FIG. 6, the invention is shown as including a data acquisition component 86, comprising a sixteen channel multiplexer, multiplexed to transfer data to an 8-bit analog to digital converter. The component 86 performs all of the transformations of data from analog to digital form as required by the system.

As further shown in FIG. 6, three to eight decoders 90,92 are provided for selecting the proper input/output ports for respectively reading or writing data. In other words, the decoders 90,92 address the input/output ports, the decoder 90 for read functions, and the decoder 92 for write functions. Of course, in standard fashion, an octal buffer 88 is provided in communication with the data bus for transferring data from the analog to digital converter of the component 86 to other processing elements in the system.

Figure 7:
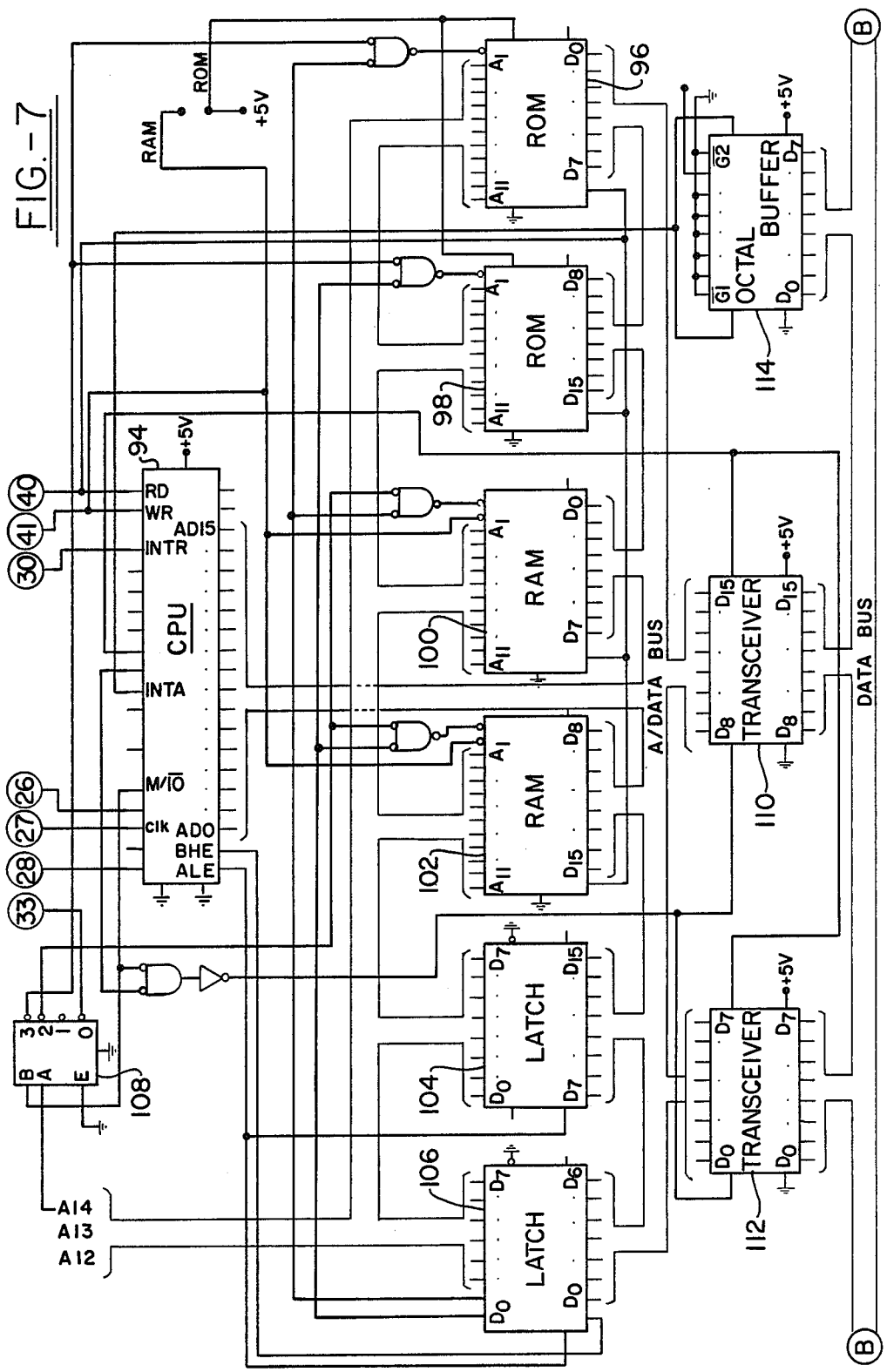

FIG. 7 illustrates the basic processing unit of the brake control system. As shown, a suitable microprocessor 94 is provided with associated read only memories 96,98. In standard fashion, such memories would typically receive and maintain therein the operation programs of the invention. In similar fashion, communicating with the microprocessor 94, are random access memories 100,102. These memories typically provide the scratch pad memories, temporary storage, and processed data receptacles for the data processing performed by the microprocessor 94. Further, and again in standard fashion, latches 104,106 are provided in communication with the microprocessor 94 for providing addresses to the memories 96-102, the decoders 90,92, and the data acquisition component 86.

The two to four decoder 108 determines whether a read function is to be performed from memory or from one of the input/output devices as designated by the decoder 90. To this extent, the two to four decoder 108 and the three to eight decoder 90 operate in conjunction with each other to control read operations.

As further shown in FIG. 7, transceivers 110,112 are interposed between the data bus and the address/data bus to allow for communications therebetween. Of course, the transceivers 110,112 would be bi-directional for such purpose. The transceivers 110, 112 act as buffers for the memories 96-102. Effectively, the microprocessor 94 generates a control signal as to the elements with which it desires to communicate, such communication being generally achieved through the transceivers 110,112.

Figure 8:
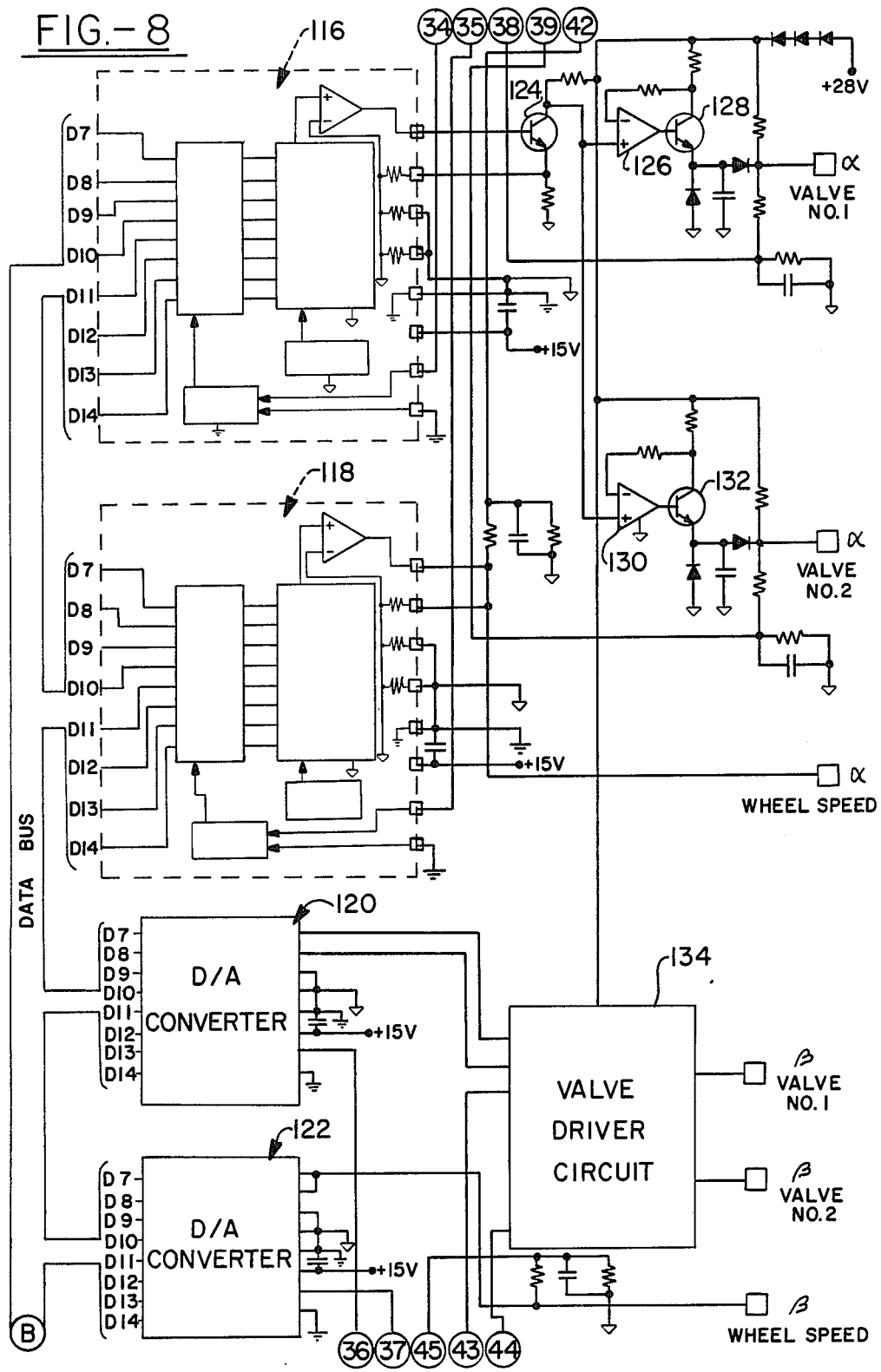

As shown in FIG. 8, the digital to analog converters 116-122 are provided for receiving digital data and converting the same into analog control signals for driving the antiskid brake valves. As shown for the alpha wheel, the analog output signal is applied to a transistor 124, the output of the collector thereof driving the positive input of the amplifier 126. The amplifier 126, in turn, controls the driving transistor 128 which controls the first valve of the alpha wheel. In similar fashion, the transistor 124 controls the amplifier 130 to gate the driving transistor 132 which, in turn, controls the second valve of the alpha wheel. It will be appreciated that valve drivers 134 are provided for controlling the two valves of the beta wheels, the same being of substantially the same nature as just described with respect to the alpha wheels.

It should be briefly noted, before discussing the operational capabilities of the system just described, that a test circuit, comprised essentially of the two to four decoder 136 of FIG. 1, may be provided for purposes of testing the wheel speed transducer, interface, converter, and the like as shown in FIG. 1. The decoded output of the circuit 136 may be applied to excite various portions of the wheel speed detection circuitry of FIG. 1, with the result being monitored by the microprocessor through the use of the data acquisition system to detect, or assure, the complete and proper operation of such circuitry.

Figure 9:
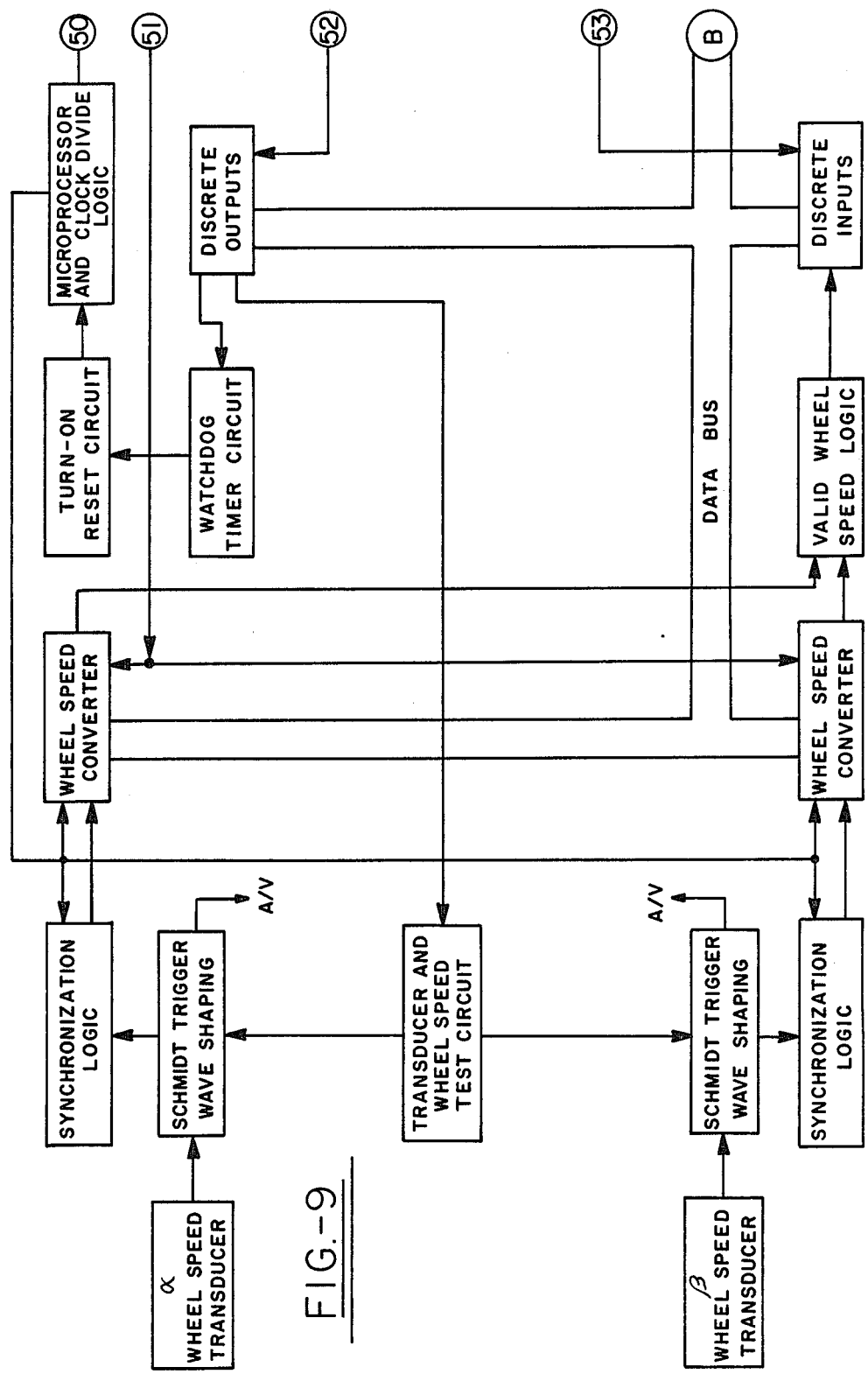
FIGS. 9 through 11 comprise a structural block diagram of the system presented in FIGS. 1-8.
Figure 10:
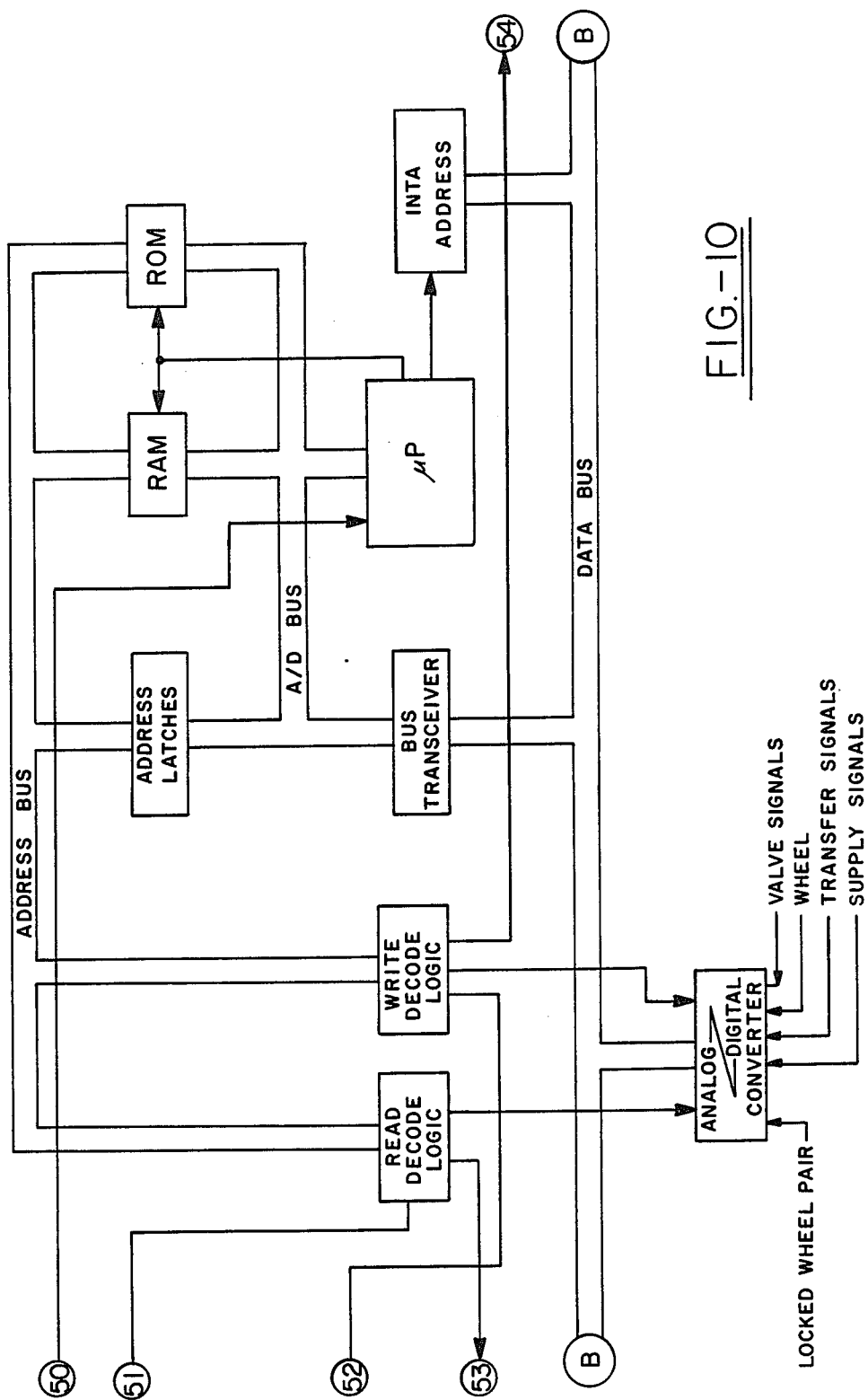
Figure 11:
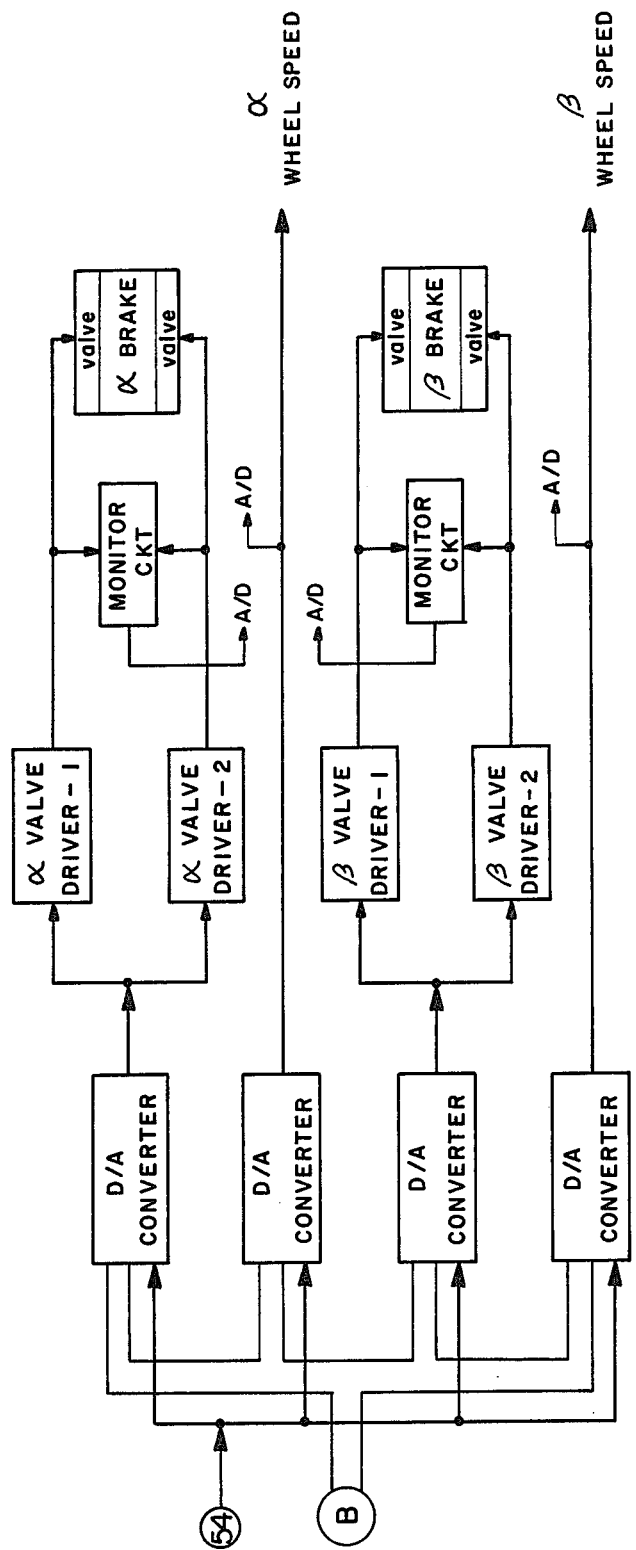

It will be readily appreciated by those skilled in the art that the detailed circuitry presented and described above with reference to FIGS. 1-8, is illustratively shown by the functional block diagram of FIGS. 9-11. The block diagram, labeled as to function, demonstrates the function and operation of the system presented herein in terms readily recognized and accepted by those versed in the antiskid art. Again, while the embodiment of the functional block diagram of FIGS. 9-11 shows a two channeled system, it will be understood that the system may be readily expanded to accommodate any number of braked wheels or wheel pairs.

Figure 12:
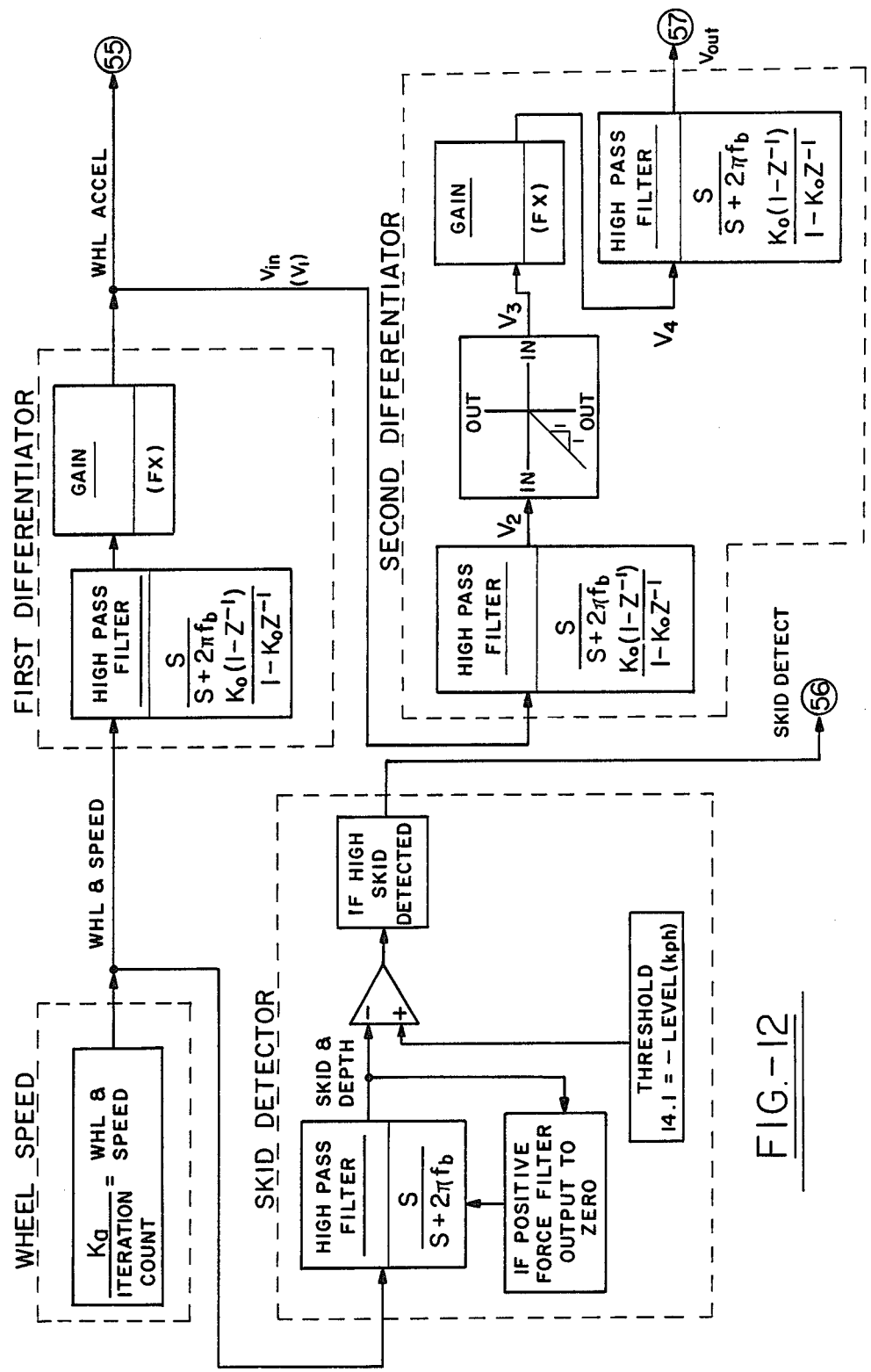
FIGS. 12-14 comprise an example of the transfer function flow chart which might be incorporated with the structure of the invention.
Figure 13:
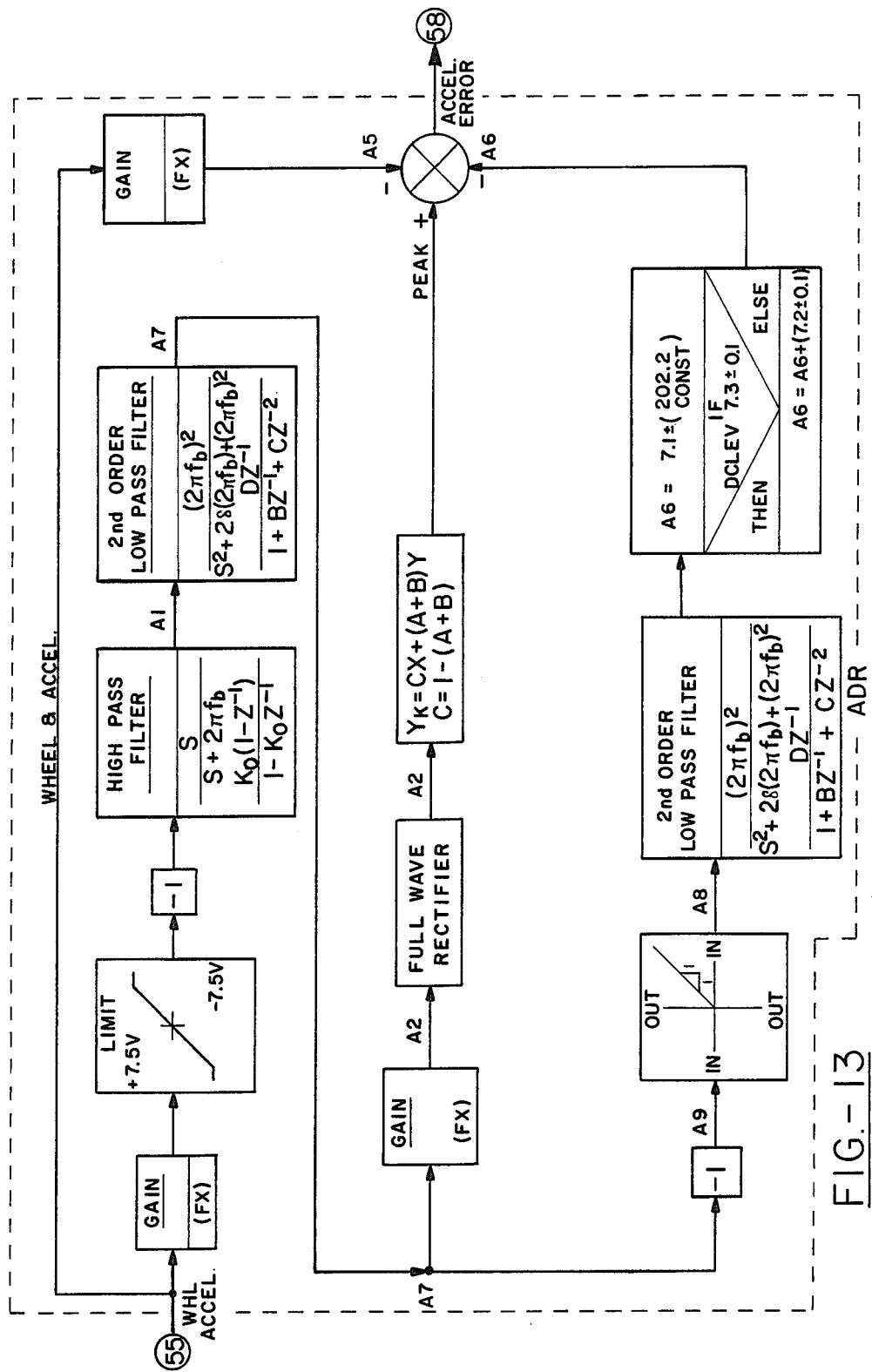
Figure 14:
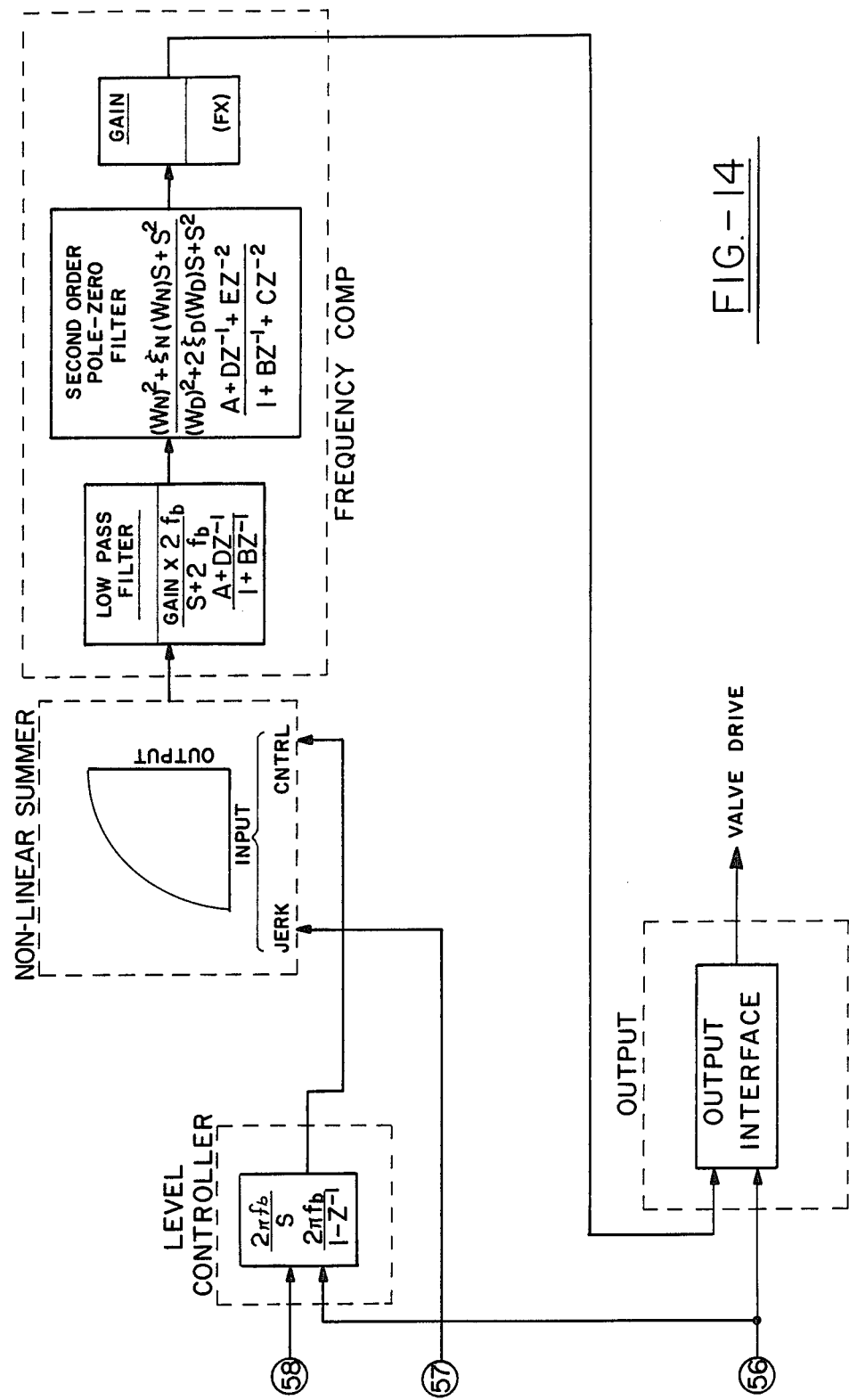

With reference now to FIGS. 12-14, an appreciation may be gained of a mathematical algorithm which may be used in association with the structure presented above. The wheel speed is determined by dividing a constant Ka by an iteration count. The constant Ka may be used for modifying the digital wheel speed signal based on certain parameters of the aircraft such as, for example, the number of teeth in the transducer, the landing speed of the aircraft, the circumference of the wheel, or the like. The constant Ka is used to increase the resolution of the wheel speed sensor to sense the changes in wheel speed. The iteration count is that count taken from the buffers over a fixed time period as discussed above with respect to the binary counters 38-44. In any event, it will be appreciated that the wheel speed of the aircraft is appropriately determined in a digital manner.

This wheel speed is passed to a first differentiator with the resultant output being wheel deceleration as is well known in the art. The first differentiator may simply comprise a high-pass filter having appropriate gain associated therewith. A second differentiator receives the output of the first differentiator to operate as a lead network. This circuit, again comprising a high-pass filter with appropriate gain associated therewith differentiates wheel deceleration, being the second derivative of wheel speed, to provide a signal indicative of deep skids, or indicating when wheel deceleration changes rapidly. This lead network allows the system to anticipate deep skidding activity before the same occurs such that rapid release of brake pressure may be achieved and the skid avoided.

With further reference to FIG. 12, it can be seen that a skid detector receives the wheel speed output then determines the presence of a deep skid. The skid detector includes a differentiator consisting of a high-pass filter. The filter is biased such that the output thereof is forced to zero if the wheel is accelerating rather than decelerating. The output of the high-pass filter is passed to a comparator having a set threshold such that an output is emitted only when the high-pass filter output exceeds a particular level, such level being indicative of a deep skid. When the comparator presents an output, the same is applied directly to the output interface of FIG. 14 to directly affect the valve driver to dump brake pressure.

FIG. 13 depicts an adaptive deceleration reference transfer function used in association with the invention. As shown, three inputs are provided to a summing point in this circuit, the output of which is an acceleration error signal. The first input, designated A5, is simply a wheel deceleration signal with appropriate gain. This input to the summing point is a reference signal such that, at constant deceleration, the input A5 is a DC reference. The PEAK positive input to the summing point is an average of the deceleration signals. This circuit detects the peaks of perterbations from skids sensed during braking operation. Finally, the input A6 to the summing point is provided as a reference to the summing point as a fast recovery signal. If skids are not being experienced, such that there is no A-C component to the input of the circuitry generating A6, the signal A6 increases in amplitude to set a higher threshold at the summing point to accommodate more braking. The circuit functions on a counter/timer, increasing the threshold provided by A6 in accordance with the period of time over which skidding perturbations are absent.

The output of the summing point of FIG. 13, establishing an acceleration error signal, and the output of the skid detector of FIG. 12 are applied to the level controller of FIG. 14, which is basically an integrator. The output of the level controller is applied as a control signal to a non-linear summer, the other input thereof being the output of the second differentiator of FIG. 12. The summer is non-linear for the purpose of tailoring the output to the non-linear valve and brake torque/pressure relationships. The output of the non-linear summer is passed to a frequency compensator which compensates for the non-linearities in the valve as it responds to brake signals. In other words, the frequency compensator compensates for the frequency response characteristics of the brake valve. The output of the frequency compensator is applied to the output interface to directly control the valve driver.

It can thus be seen from the algorithm of FIGS. 12–14 that the brake valve of the system can be affected by the output of a skid detector or a deceleration error signal, the latter also being affected by a second order lead network. Accordingly, the algorithm presents a proportional, integral, and derivative control of the braking activity of the aircraft.

Thus it can be seen that the objects of the invention have been satisfied by the structure presented hereinabove. While in accordance with the Patent Statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. An antiskid system in association with a braked wheel of vehicle, comprising:

first means connected to the braked wheel for producing an output signal corresponding to wheel speed;

second means connected to said first means for receiving and differentiating said output signal and generating therefrom a deceleration signal;

third means connected to said second means for differentiating said deceleration signal and applying such differentiated deceleration signal to a summing point of a summing means;

skid detection means receiving said output signal from said first means and generating a skid signal when the derivative of said output signal exceeds a predetermined level;

brake control means interconnected between said second means and said skid detection means, receiving said deceleration signal and said skid signal and accordingly releasing brake pressure; and wherein said differential deceleration is applied to a peak detection means for detecting the peaks of perterbations in said differentiated decleration signal and determining an average of such peaks, and applying such average to said summing point, said differential deceleration signal being further applied to an AC detection means for determining the presence or absence of changes in said differentiated deceleration signal and providing a signal indicative thereof to said summing point, said summing point providing an error signal to valve means for regulating application and release of brake pressure.

2. The antiskid system according to claim 1 wherein said first means comprises a wheel speed transducer presenting an analog output signal corresponding to instantaneous wheel speed.

3. The antiskid system according to claim 2 wherein said first means further includes a squaring circuit receiving said analog output signal and generating a train of pulses therefrom, of a frequency dependent upon said instantaneous wheel speed.

4. The antiskid system according to claim 3 wherein said first means further includes a clock, generating clock signals of fixed frequency, and applying such clock signals to a counter, said counter being enabled by said pulses, the number of clock signals applied to said counter between said pulses 5. The antiskid system according to claim 1 which further includes means interposed between said summing point and said valve means for converting said error signal from AC to DC.

* * * * *

UNITED STATES PATENT AND TRADEMARK OFFICE
CERTIFICATE OF CORRECTION

PATENT NO. : 4,773,013

DATED : Sep. 20, 1988

INVENTOR(S) : Crapanzano et al.

It is certified that error appears in the above-identified patent and that said Letters Patent is hereby corrected as shown below:

Column 8, line 33, change "differential deceleration" to --differentiated deceleration signal--.

Column 8, line 38, change "differential" to --differentiated--.

Signed and Sealed this

Thirteenth Day of June, 1989

Attest:

DONALD J. QUIGG

Attesting Officer

Commissioner of Patents and Trademarks